United States Patent
Daley et al.

(10) Patent No.: US 10,648,747 B2
(45) Date of Patent: May 12, 2020

(54) MODULAR COOLING TOWER WITH SCREWLESS FRP EXTERIOR

(71) Applicant: Composite Cooling Solutions, L.P., Fort Worth, TX (US)

(72) Inventors: Toby Daley, Fort Worth, TX (US); James A. Bland, Rhome, TX (US)

(73) Assignee: Composite Cooling Solutions, L.P., Fort Worth, TX (US)

( * ) Notice: Subject to any disclaimer, the term of this patent is extended or adjusted under 35 U.S.C. 154(b) by 0 days.

(21) Appl. No.: 16/127,069

(22) Filed: Sep. 10, 2018

(65) Prior Publication Data

US 2019/0178587 A1  Jun. 13, 2019

Related U.S. Application Data

(63) Continuation-in-part of application No. 15/444,055, filed on Feb. 27, 2017, now abandoned.

(60) Provisional application No. 62/555,893, filed on Sep. 8, 2017, provisional application No. 62/300,554, filed on Feb. 26, 2016.

(51) Int. Cl.
| | |
|---|---|
| *F28F 9/00* | (2006.01) |
| *F28F 25/10* | (2006.01) |
| *F28F 25/04* | (2006.01) |
| *F28C 1/16* | (2006.01) |
| *F28C 1/00* | (2006.01) |
| *E04H 5/12* | (2006.01) |
| *F28F 9/007* | (2006.01) |
| *F28F 21/06* | (2006.01) |
| *F28F 25/08* | (2006.01) |

(52) U.S. Cl.
CPC ............... *F28F 9/001* (2013.01); *E04H 5/12* (2013.01); *F28C 1/00* (2013.01); *F28C 1/16* (2013.01); *F28F 9/0075* (2013.01); *F28F 21/06* (2013.01); *F28F 25/04* (2013.01); *F28F 25/08* (2013.01); *F28F 25/10* (2013.01)

(58) Field of Classification Search
CPC ...... E04H 5/12; F28C 1/00; F28C 1/16; F28F 9/001; F28F 9/0075; F28F 21/06; F28F 25/04; F28F 25/08; F28F 25/10
USPC ............................................ 261/30, DIG. 11
See application file for complete search history.

(56) References Cited

U.S. PATENT DOCUMENTS

| | | | | |
|---|---|---|---|---|
| 3,100,556 | A * | 8/1963 | De Ridder | F16B 5/008 |
| | | | | 52/588.1 |
| 4,913,710 | A * | 4/1990 | Reverdy | F28C 1/02 |
| | | | | 261/DIG. 11 |
| 5,028,357 | A | 7/1991 | Bardo | |
| 5,236,625 | A * | 8/1993 | Bardo | F28C 1/00 |
| | | | | 261/24 |
| 5,811,035 | A * | 9/1998 | Mockry | E04B 5/026 |
| | | | | 261/111 |
| 6,237,900 | B1 * | 5/2001 | Drew | F28C 1/00 |
| | | | | 261/111 |
| 8,938,927 | B1 | 1/2015 | Bragg | |

(Continued)

*Primary Examiner* — Charles S Bushey

(57) ABSTRACT

A factory-assembled or packaged cooling tower/cell having screwless (and boltless) exterior side panels is provided. The exterior panels are double-walled and are fastened to an outer support member, such as a corner end cap. Only fasteners extending through the outer support member and through only one of the walls of the panels are utilized. This eliminates the possibility of leaking fluid emanating from use of the fasteners.

15 Claims, 3 Drawing Sheets

(56) References Cited

U.S. PATENT DOCUMENTS

2014/0264970 A1\* 9/2014 Bickerstaff ............... E04H 5/12
                                                    261/108
2017/0248369 A1\* 8/2017 Bland ....................... E04H 5/12

\* cited by examiner

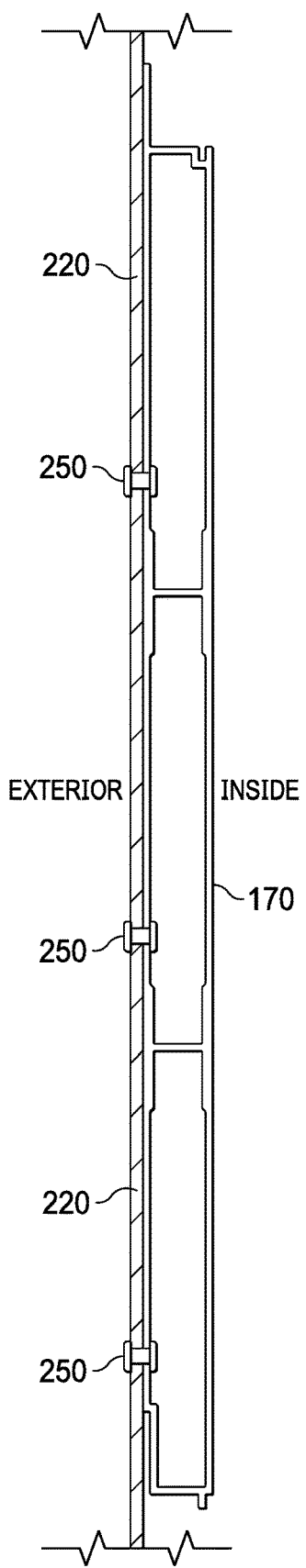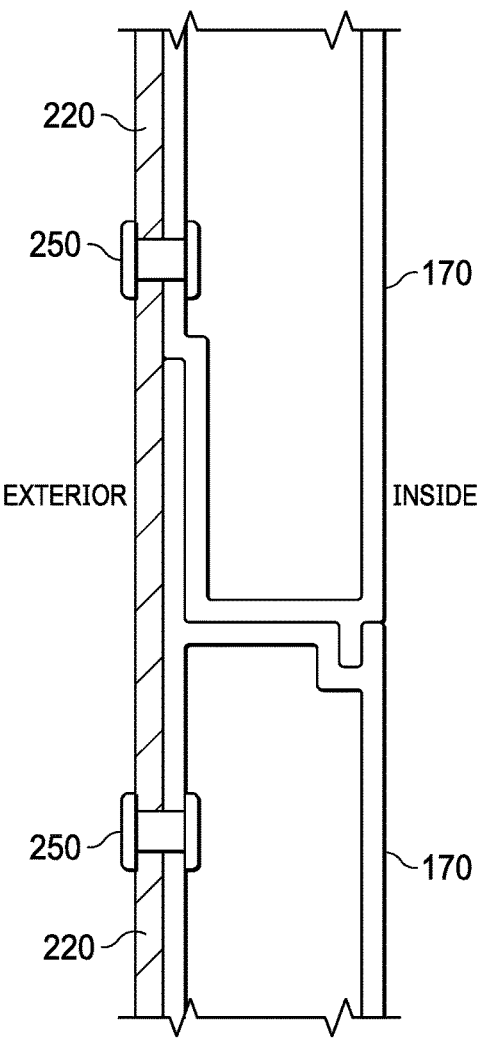
FIG. 3A
FIG. 3B

MODULAR COOLING TOWER WITH SCREWLESS FRP EXTERIOR

CROSS-REFERENCE TO RELATED APPLICATION(S) AND CLAIM OF PRIORITY

The present application claims priority to U.S. Provisional Patent Application No. 62/555,893, filed on Sep. 8, 2017. The present application is also a continuation-in-part of, and claims priority, to U.S. application Ser. No. 15/444,055, entitled, "Panel Wall Structure For Use in a Tower/Frame Structure and Cooling Tower", filed on Feb. 27, 2017, now abandoned, which claims priority to U.S. Provisional Patent Application No. 62/300,554, filed on Feb. 26, 2016. All of the aforementioned applications are hereby incorporated by reference into the present application as if fully set forth herein.

TECHNICAL FIELD

The present disclosure relates to cooling towers and components for building same, and in particular, to a modular cooling tower having screwless (and boltless) exterior double wall panels.

BACKGROUND

Cooling towers are used to cool liquid by contact with air. Many cooling towers are of the counter-flow type, in which the warm liquid is allowed to flow downwardly through the tower and a counter current flow of air is drawn by various means upward through the falling liquid to cool the liquid. Other designs utilize a cross-flow of air, and forced air systems. A common application for liquid cooling towers is for cooling water to dissipate waste heat in electrical generating and process plants and industrial and institutional air-conditioning systems.

Most cooling towers include a tower or frame structure. This structural assembly is provided to support dead and live loads, including air moving equipment such as a fan, motor, gearbox, drive shaft or coupling, liquid distribution equipment, such as distribution headers and spray nozzles, and heat transfer surface media such as a fill assembly. The fill assembly material generally has spaces through which the liquid flows downwardly and the air flows upwardly to provide heat and mass transfer between the liquid and the air. Different types of fill materials, e.g., stacked layers of open-celled clay tiles, are commercially available, depending on the desired design and operating characteristics.

Due to the corrosive nature of the air and water drawn through such cooling towers, it has been the past practice to either assemble such cooling towers of stainless steel or galvanized and coated metal, or for larger field-erected towers, to construct such cooling towers of wood, which is chemically treated under pressure, or concrete at least for the structural parts of the tower, or combination of these materials.

These cooling towers are generally categorized as either field-erected (constructed on site) or factory-assembled/packaged units (constructed at a factory and transported to the site). Typically, for packaged units, each unit is a single cell (self-contained, with separate collecting basin, fill, fluid distribution system, input/output, fan, etc.) and multiple cells may be grouped together to form a larger overall cooling tower.

Within the last twenty years or so, prior art solutions began using fiber reinforced plastic (FRP) beams and columns including those shown in U.S. Pat. No. 7,275,734 to Bland (2007), which is incorporated herein by reference, for larger field-erected cooling towers. For smaller factory-assembled units, the support structures may utilize metal or FRP components, or combination of both. However, the smaller single cell units include exterior panels constructed from metal (e.g., stainless/galvanized metal), which require bolts or screws for fastening together. The apparent hole(s) necessary for these fastening types result in the potential for leaks from the interior to the exterior—which is undesirable.

As such, a need exists for a factory-assembled single cell cooling tower unit having exterior fiber reinforced plastic panels fastened using no, or relatively few, conventional bolts or screws. Accordingly, such a cooling tower having exterior panels using screwless and boltless fastening means is desired. Such a construction reduces or eliminates the potential for leaks and/or the need for applying waterproofing materials around the fasteners.

SUMMARY

In accordance with one aspect of the present disclosure, there is provided a packaged cooling tower having a support frame structure defining an interior volume, a fluid distribution system to distribute fluid within the interior volume defined by the support frame structure and disposed at an upper level, a heat transfer material disposed at the upper level and within the interior volume defined by the support frame structure and for receiving fluid from the fluid distribution system and through which the fluid travels, a fluid collection basin disposed below the support frame structure, air moving equipment operable for causing air movement for heat transfer between the fluid and air, the air moving equipment comprising at least two fan units, and an air inlet disposed an a lower level. An exterior panel wall is disposed above the air inlet and at the upper level and forms a first exterior side of the cooling tower. The exterior panel wall includes a first double wall panel member and a second double wall panel member, wherein each double wall panel member comprises a first outer wall spaced laterally from a second outer wall, the first and second outer walls comprising fiber reinforced material, and a corner member fastened to the first double wall panel member via a first fastener and fastened to the second double wall panel member via a second fastener. The first and second fasteners extend only through the corner member and the first outer wall of the first and second double wall panels, respectively.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIGS. 3A and 3B are cross-sectional views of a corner end cap fastened to a double-wall panel in accordance with the present disclosure.

DETAILED DESCRIPTION

Figure 1:
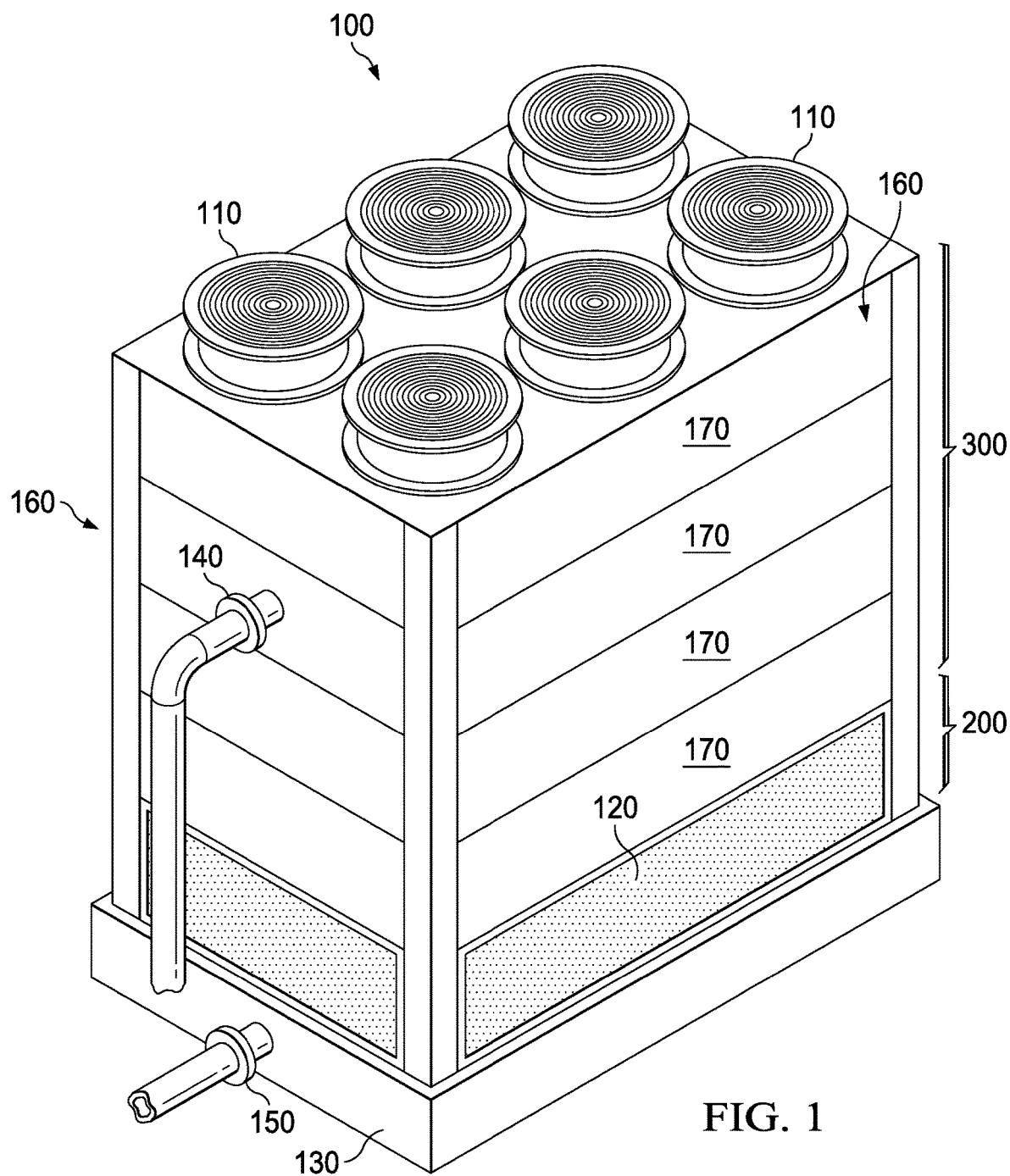
FIG. 1 is a perspective view of a cooling tower in accordance with the present disclosure.

Now referring to FIG. 1, there is a perspective view of a counterflow-type, factory-assembled cooling tower, designated as 100, in accordance with the present disclosure. The cooling tower 100 includes an internal support frame or structure (not shown) intended to support the other components or materials of the cooling tower.

In addition to the support frame/structure, the cooling tower internally includes a fluid distribution system, nozzles and fill material (not shown)—all typical in a counterflow-type cooling tower.

In the cooling tower 100, multiple fans 110 (and motors) are mounted on top and draw air from lower level 200 via air intake openings 120 through the cooling tower to exit. A collection basin 130 collects the cooled fluid as it falls from nozzles onto the fill material and downward. An input 140 transfers hot fluid to the internal fluid distribution system (not shown), while an output 150 transfers the cooled fluid from the collection basin 130—as shown. The exterior of upper level 300 of the cooling tower 100 is covered with a casing 160 constructed of multiple panels 170 of fiber reinforced plastic (FRP). As will be appreciated, the upper level 300 is the level at which the fill material and fluid distribution system (not shown) are disposed.

As known in the art, the fill material provides a heat transfer function and media. Generally, the fill is open-celled material that allows water from the water distribution system to pass downwardly and air to pass upwardly, with heat transfer taking place between the water and air as they pass. Open-celled clay tile or polyvinyl chloride (PVC) materials or other open cell heat transfer media may be used. Various types of fill material may be used, and such fill material is commercially available. The cooling tower 100 of the present disclosure is not limited to use of any particular type of fill material. The present disclosure may also be applicable to cross-flow designs.

The panels 170 may be the double-walled panels (10, 200, 200b, 200c) described in U.S. patent application Ser. No. 15/444,055, entitled, "Panel Wall Structure For Use in a Tower/Frame Structure and Cooling Tower" to Bland, and filed on Feb. 27, 2017, which is incorporated herein by reference. Other suitable double-walled panels may be utilized. In addition, the internal components, e.g., fill material, nozzles, fluid distribution system, etc. (not shown in FIGS. 1-3) may the same or similar to those described in the U.S. patent application Ser. No. 15/444,055 and configured to be utilized in a smaller factory-assembled, packaged cooling tower/cell.

Figure 2:
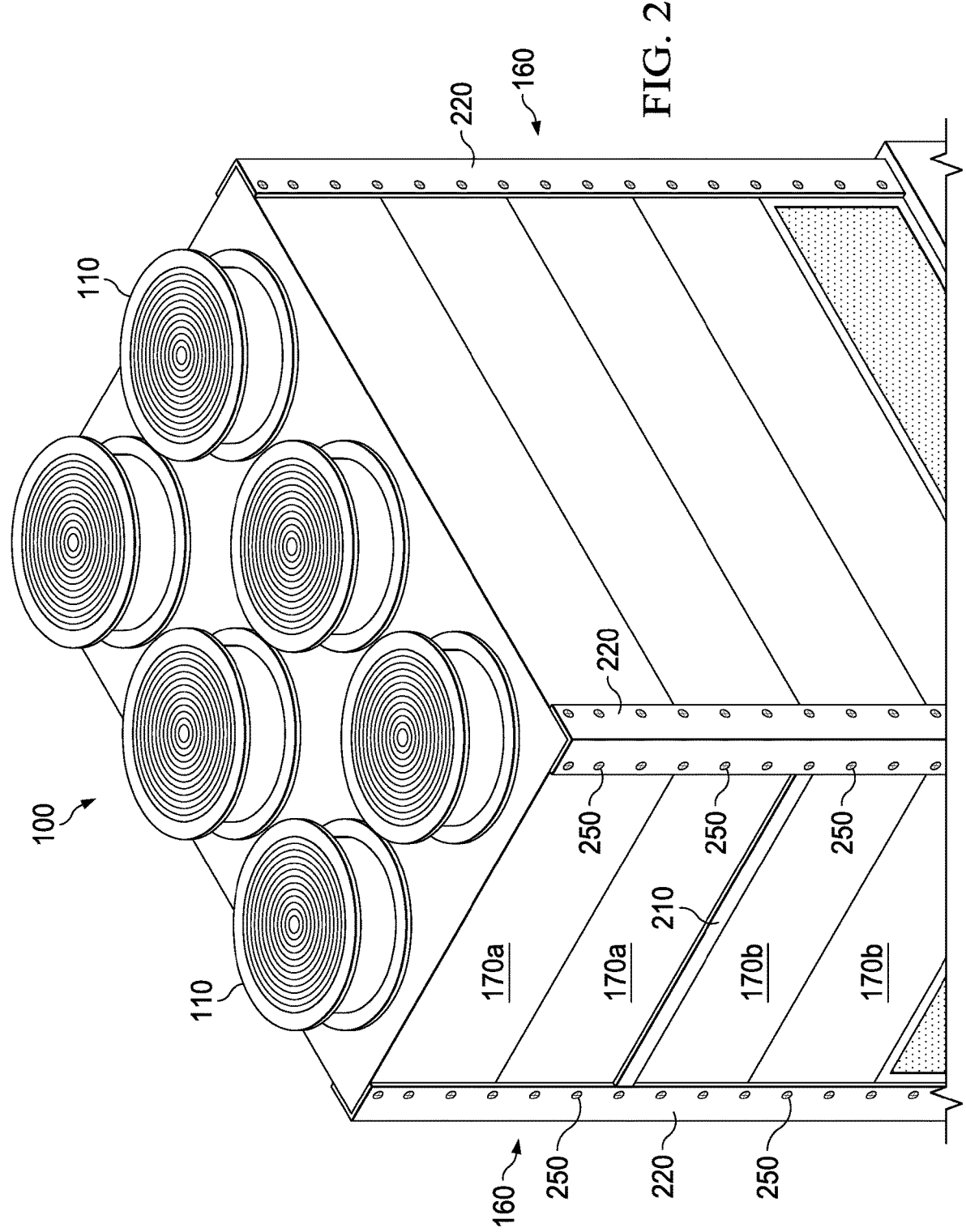
FIG. 2 is a close-up perspective view of the cooling tower shown in FIG. 1.

Now turning to FIG. 2, there is shown a close-up, perspective view illustrating the exterior casing or walls 160 with multiple panels 170 at the upper level 300 of the cooling tower 100. In the embodiment shown, each side includes four panels 170—as shown in FIG. 2. An optional T-shaped cross-member 210 extends from one corner to the other, and separates an upper group of two panels (170a) from a lower group of two panels (170b), to provide additional structural support for the walls 160. Each of the adjoining corners includes one or more vertical extending angle corner members 220 (or end caps) for fastening to the ends of the panels 170 on adjacent walls—as shown in FIG. 2. The corner members 220 may be constructed from FRP material, or any other suitable materials.

Multiple fasteners 250 attach the corner members to the panels 170. The number and size of the fasteners 250 will depend on the desired application. In one embodiment, the fasteners 250 are blind fasteners, such as a blind rivet or hook rivet. Other suitable fasteners may be utilized—those fasteners which extend only through one of the two walls of the double wall panels 170. Use of double wall panels 170 and such fasteners provides a leakproof connection that prevents fluid from leaking inside to outside. Use of conventional bolts/nuts would require the bolt extend through both walls of the panel 170 in order to fasten. Moreover, the use of conventional screws, even if they were to extend only through one wall of the panel 170, do not provide the necessary fastening strength.

Also shown in FIG. 2 are several conventional fasteners 290 for attaching the corner members to the inner support frame structure (which may be necessary for overall structural support). Although these may be prone to potential leaking, the number of these conventional fasteners is few and their placement limited.

Now turning to FIG. 3A, there is illustrated a partial cross-sectional view detailing one corner member 220 attached to the panel 170 and showing the fasteners 250. FIG. 3B is a close-up illustrating the corner member 220 attached to two abutting panels 170a, 170b.

The panel members 170a, 170b are secured to the corner member 220 using fasteners 250. Typically, a hole is drilled through the corner member 220 and the exterior-facing wall of the panel 170. The fastener 250 is then inserted and processed according to the type of fastener. If, for example, the fastener 250 is a blind rivet, the rivet is conventionally inserted and secured using a rivet gun or tool. As will be appreciated, the internal cavity of the panel 170 (because of the second interior-facing wall) is isolated from the fluid within the cooling tower. This results in the fastener 250 also being isolated from the interior of the cooling tower, and thus, eliminates the potential for fluid to leak through the panel 170 via the fastener 250. In other words, the inner wall of the double-wall panel 170 provides a barrier preventing fluid from reaching the fasteners 250 because the fasteners 250 do not extend through the inner wall.

It may be advantageous to set forth definitions of certain words and phrases that may be used within this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "couple" or "connect" refers to any direct or indirect connection between two or more components, unless specifically noted that a direct coupling or direct connection is present.

Although the present disclosure and its advantages have been described in the foregoing detailed description and illustrated in the accompanying drawings, it will be understood by those skilled in the art that the invention is not limited to the embodiment(s) disclosed but is capable of numerous rearrangements, substitutions and modifications without departing from the spirit and scope of the invention as defined by the appended claims.

What is claimed is:

1. A packaged cooling tower, comprising:
   a support frame structure defining an interior volume;
   a fluid distribution system to distribute fluid within the interior volume defined by the support frame structure and disposed at an upper level;
   a heat transfer material disposed at the upper level and within the interior volume defined by the support frame structure and for receiving fluid from the fluid distribution system and through which the fluid travels;
   a fluid collection basin disposed below the support frame structure;

air moving equipment operable for causing air movement for heat transfer between the fluid and air, the air moving equipment comprising at least two fan units;
an air inlet disposed in a lower level; and
an exterior panel wall disposed above the air inlet and at the upper level and forming a first exterior side of the cooling tower, the exterior panel wall comprising,
a first double wall panel member and a second double wall panel member, wherein each double wall panel member comprises a first wall spaced laterally from a second outer wall, the first walls and second outer walls comprising fiber reinforced material,
a corner member fastened to the first double wall panel member via a first fastener and fastened to the second double wall panel member via a second fastener, and
wherein the first and second fasteners extend only through the corner member and the second outer walls of the first and second double wall panels, respectively.

2. The packaged cooling tower in accordance with claim 1, wherein the corner member is disposed adjacent to the second outer wall of the first double wall panel member and to the second outer wall of the second double wall panel member.

3. The packaged cooling tower in accordance with claim 1, wherein each double wall panel member further comprises:
a first inner wall, a second inner wall and a third inner wall, each inner wall extending from the first wall to the second outer wall and comprising fiber reinforced material.

4. The packaged cooling tower in accordance with claim 1, further comprising:
a T-shaped cross-member separating the first double wall panel member from the second double wall panel member.

5. The packaged cooling tower in accordance with claim 1, wherein the first fastener and the second fastener each comprise a rivet.

6. A packaged cooling tower, comprising:
a support frame structure defining an interior volume;
a fluid distribution system to distribute fluid within the interior volume defined by the support frame structure and disposed at an upper level;
a heat transfer material disposed at the upper level and within the interior volume defined by the support frame structure and for receiving fluid from the fluid distribution system and through which the fluid travels;
a fluid collection basin disposed below the support frame structure;
air moving equipment operable for causing air movement for heat transfer between the fluid and air, the air moving equipment comprising at least two fan units;
an air inlet disposed in a lower level; and
an exterior panel wall disposed above the air inlet and at the upper level and forming a first exterior side of the cooling tower, the exterior panel wall comprising:
a first double wall panel member and a second double wall panel member, wherein each double wall panel member comprises a first interior-facing wall spaced laterally from a second exterior-facing wall, the first walls and second walls comprising fiber reinforced material,
a corner member fastened to the first double wall panel member via a first fastener and fastened to the second double wall panel member via a second fastener, and
wherein the first and second fasteners extend through the corner member and through second exterior-facing walls of the first and second double wall panels, respectively, and the first and second fasteners do not extend through the first interior-facing walls.

7. The packaged cooling tower in accordance with claim 6, wherein the corner member is disposed adjacent to the second exterior-facing wall of the first double wall panel member and to the second exterior-facing wall of the second double wall panel member.

8. The packaged cooling tower in accordance with claim 6, wherein each double wall panel member further comprises:
a first inner wall, a second inner wall and a third inner wall, each inner wall extending from the first interior-facing wall to the second exterior-facing wall and comprising fiber reinforced material.

9. The packaged cooling tower in accordance with claim 6, further comprising:
a T-shaped cross-member separating the first double wall panel member from the second double wall panel member.

10. The packaged cooling tower in accordance with claim 6, wherein the first fastener and the second fastener each comprise a rivet.

11. A packaged cooling tower, comprising:
a support frame structure defining an interior volume;
a fluid distribution system to distribute fluid within the interior volume defined by the support frame structure and disposed at an upper level;
a heat transfer material disposed at the upper level and within the interior volume defined by the support frame structure and for receiving fluid from the fluid distribution system and through which the fluid travels;
a fluid collection basin disposed below the support frame structure;
air moving equipment operable for causing air movement for heat transfer between the fluid and air, the air moving equipment comprising at least two fan units;
an air inlet disposed in a lower level; and
an exterior panel wall disposed above the air inlet and at the upper level and forming a first exterior side of the cooling tower, the exterior panel wall comprising:
a first double wall panel member and a second double wall panel member, wherein each double wall panel member comprises a first wall spaced laterally from a second outer wall, the first walls and second outer walls comprising fiber reinforced material,
a corner member fastened to the first double wall panel member via a first fastener and fastened to the second double wall panel member via a second fastener, and
wherein the first and second fasteners extend through the corner member and through the second outer walls of the first and second double wall panels, respectively, and the first and second fasteners do not extend through the first walls.

12. The packaged cooling tower in accordance with claim 11, wherein the first fastener and the second fastener each comprise a rivet.

13. The packaged cooling tower in accordance with claim 11, wherein the corner member is disposed adjacent to the second outer wall of the first double wall panel member and to the second outer wall of the second double wall panel member.

14. The packaged cooling tower in accordance with claim 11, wherein each double wall panel member further comprises:
a first inner wall, a second inner wall and a third inner wall, each inner wall extending from the first wall to the second outer wall and comprising fiber reinforced material.

15. The packaged cooling tower in accordance with claim 11, further comprising:
a T-shaped cross-member separating the first double wall panel member from the second double wall panel member.

* * * * *